United States Patent [19]

Numberger

[11] 4,048,019
[45] Sept. 13, 1977

[54] INSTALLATION FOR PRODUCING GREEN MALT FROM BARLEY AND/OR FOR STORING AND CONTINUOUSLY DISPENSING GREEN MALT

[76] Inventor: Christian Konrad Numberger, St. Wolfgang, Germany, 8251

[21] Appl. No.: 684,106

[22] Filed: May 7, 1976

[30] Foreign Application Priority Data

May 28, 1975 Germany .............................. 2523709

[51] Int. Cl.² .......................................... C12C 1/04
[52] U.S. Cl. .................................................. 195/129
[58] Field of Search .................. 426/28; 195/128, 129, 195/130, 131, 132, 133; 99/467, 471

[56] References Cited

U.S. PATENT DOCUMENTS 3,205,152   9/1965   Geys ..................................... 195/129

Primary Examiner—R. B. Penland

Attorney, Agent, or Firm—Owen, Wickersham & Erickson

[57] ABSTRACT

An installation for the continuous germination of barley into green malt includes a vertically disposed container through which barley progresses from top to bottom by gravity. A series of grids of parallel tubes extend through the container at spaced levels, with the tubes of adjacent grids being angularly offset from one another. The tubes carry a cooling medium to remove the heat of germination, and also act to loosen and turn over the slowly sinking barley, as well as to control the pressure acting on the column of barley. At the container bottom a dispensing device controls the outflow of green malt. Means may be provided for supplying air in the container and/or for withdrawing carbon dioxide. The installation may be used for the storage and dispensing of already germinated green malt instead of for the germination process itself.

7 Claims, 3 Drawing Figures

INSTALLATION FOR PRODUCING GREEN MALT FROM BARLEY AND/OR FOR STORING AND CONTINUOUSLY DISPENSING GREEN MALT

BACKGROUND OF THE INVENTION

The invention relates to an installation for producing green malt from steeped barley and/or for storing and continuously dispensing green malt, with a container which is filled from above with barley or green malt.

Malt is required for producing beer. Malt is derived from barley. For this purpose, the barley is at first softened with water and brought to germination. By germination, the barley grains are broken open and the ferments required for beer production are formed. The germinated barley is called green malt.

Hitherto, green malt has been produced by depositing the barley in germination boxes. Turnover vehicles with downwardly projecting turning worms are movably mounted above a plurality of juxtaposed germinating boxes on a rail system and turn over the germinating material. The germinating boxes are air-permeable at the bottom. Since the germinating process proceeds exothermically, it is necessary to eliminate heat. This is accomplished by the introduction of cooled air into the germinating boxes from below. After the green malt has been formed, the germinating boxes are emptied and the green malt is then dried in a kiln system.

The above-described production of green malt proceeds discontinuously. Because of the juxtaposed boxes, the installation requires a relatively large amount of space. The boxes can be filled with barley only up to a specific height, since otherwise the pressure exerted by the upper layers onto the lower layers is too high.

The underlying object of the invention is to provide an installation for producing green malt from barley in which work is carried out continuously and therefore more economically and which, further, requires less space in the way of base surface.

SUMMARY OF THE INVENTION

The above problems are solved in accordance with the invention by the provision of a container having several grids of parallel tubes disposed through the container in substantially horizontal planes, with clearance between adjacent grids. The tubes of adjacent grids are angularly offset in relation to each other. All of the tubes are connected to a supply system for cooling medium, and a dispensing device is provided at the bottom of the container.

The installation in accordance with the invention operates continuously. The barley is introduced into the container at the top, and green malt may be withdrawn continuously from the dispensing device at the bottom of the container. The time duration for passage of the germinating material through the container is a function of the height of the container and may amount, for example, to 3 to 4 days.

The several grids, at multiple layers in the container, impart good static stability to the container, even when it is relatively tall. The tubes absorb a part of the surface pressure of the germinating material lying above it, so that, as a result of the plurality of superposed grids, it is ensured that even the lowermost layers of the germinating material in the container are not stressed beyond the permissible pressure.

The angular offset of the tubes of adjacent grids ensures that the germinating material, sinking slowly downwardly, is loosened and turned over in the required manner.

The spacing of the tubes determines the speed of sinking of the germinating material. The tubes of the grid should be spaced from each other such that the germinating barley grains form bridges between adjacent tubes in the manner of arches which prevent germinating material from flowing rapidly through the grids.

Finally, due to the fact that cooling medium can be conducted through the grids, optimal cooling of the exothermically germinating barley is made possible, thus allowing elimination of a supply of cooling air. This, in turn, has the advantage that introduction of dirt particles can be prevented which normally are carried along by the cooling air sucked in from the atmosphere. By the continuous passage of the germinated material through the installation, care is also taken that the interior of the container and the grids are kept clean at all times to a high degree as a result of the frictional and polishing effect of the germinating barley grains.

However, the installation in accordance with the invention is suitable not only for producing green malt from barley. It is also possible to introduce the already germinated barley, that is, green malt, at the top of the container and to use the installation for storing the green malt and for continuous dispensing to a kiln system connected to the installation, preferably also operated continuously. The above-mentioned advantages of the features of the invention apply here to the same degree.

In an advantageous form of the invention, the container may be comprised of a plurality of superposed boxes each of which has at least one grid. The use of separate boxes makes it possible to adapt the height of the container to prevailing circumstances as desired.

The angle of offset between the tubes of adjacent grids should be about 90°. The longitudinal and transverse grids thus formed take care of optimal loosening and turnover of the germinated material.

The tubes themselves may have any desired cross-sectional shape. However, it is particularly advantageous to use tubes which have a substantially quadrangular outer cross-section and are disposed so that their four edges point upwardly, downwardly and to both sides.

The tubes may be welded into the wall of the associated box or container. Conduit elements may be secured to the outer surface of the box, in communication with the interiors of the tubes and with the supply system for cooling medium.

A practically tested embodiment has shown that the tubes advantageously have an outer edge-to-edge dimension of about 40 mm and a spacing of about 180 mm, and that the spacing between grids should be about 370 mm. Any desired other measurements are, of course, also possible.

As a further feature of the invention, the dispensing device at the lower end of the container may comprise a movable grid or screen. The grid or the screen may comprise substantially parallel and horizontal beam-like distributor elements which taper upwardly in the form of a roof, and which are spaced from each other for passage of the green malt. The ends of the distributor elements may ride on guide rails extending transversely in relation to them. The distributor elements proper are, as a practical matter, connected with an eccentric mechanism by means of which they may be jointly periodically reciprocated.

In another practical development of the invention, the container may be provided with a device for supplying air and/or for withdrawing carbon dioxide. This device may, for example, comprise perforated tubes which are connected to a pump. Such apparatus is provided to control the germination process. During germination, the embryo develops carbon dioxide. If the carbon dioxide is not removed, it hinders the germination process. For this reason, it is advisable to remove the carbon dioxide and to introduce air. After the embryo has developed, further growth is to be prevented and fermentation promoted. To achieve this, the carbon dioxide is no longer removed, but left in the installation, and fresh air is no longer introduced. The latter is, of course, only possible because heat can be removed through the tubes of the grid, and air is not required for cooling. It is thus obvious that with an installation in accordance with the invention the process of germination and fermentation can be satisfactorily controlled.

A further development of the invention may consist in the provision of a device above the container for introducing the barley or the green malt, the device being covered over by a roof-like construction. With such a feeder device, it is possible to introduce the germination material continuously.

An embodiment of the invention is described hereinbelow in connection with the drawings.

DESCRIPTION OF A PREFERRED EMBODIMENT

Figure 1:
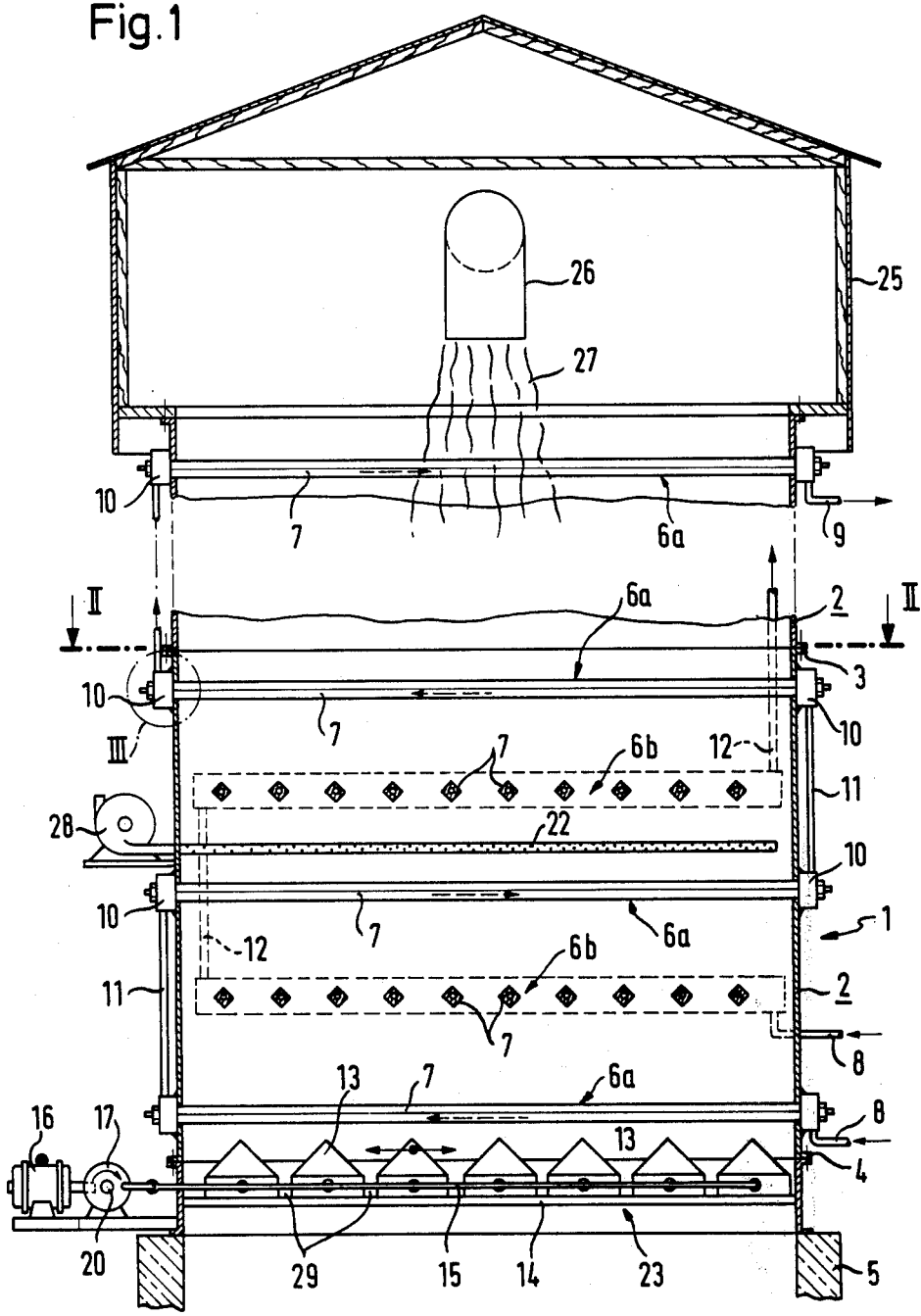
FIG. 1 is a section through a schematically represented installation in accordance with the present invention.

The installation shown in FIG. 1 comprises a container 1 which in turn is built up of a plurality of superposed boxes 2. The upper end of the box 2 shown in its entirety is designated by the numeral 3 and the lower end by the numeral 4. The entire installation rests on a foundation 5.

Each box contains a plurality of longitudinal grids 6a and transverse grids 6b, each grid comprising parallel tubes 7. The tubes 7 are connected, via supply conduits 8 and evacuation conduits 9, with a supply system for cooling medium (not shown). The cooling medium used is preferably water. The tubes 7 of each grid 6a, 6b are connected together by conduit elements 10 provided on the outer wall of the associated box 2. The conduit elements 10 of the longitudinal grid 6a are connected together by connecting conduits 11, and the conduit elements 10 of the transverse grids 6b are connected together by connecting conduits 12.

Figure 3:
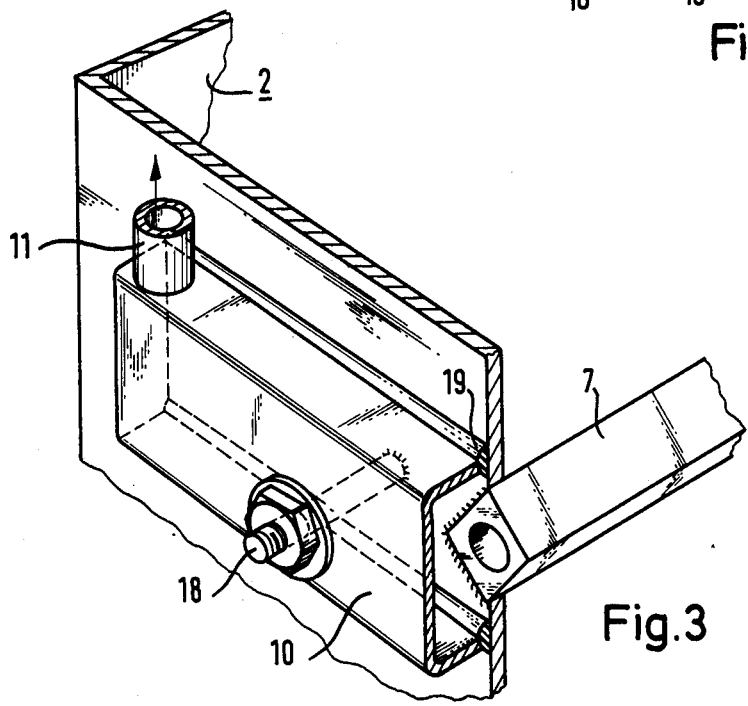
FIG. 3 is a detail III, on an enlarged scale, from FIG. 2, in perspective representation.

FIG. 3 shows the construction of the conduit elements 10. They comprise U-shaped rails which are urged by bolts 18 against rubber gaskets 19 on the outer wall of the associated box 2. It is seen in FIG. 3 that the interior of the tube 7 is in connection with the interior of the conduit element 10.

A dispensing device 23 is located at the bottom of the container 1. It comprises beam-like distributor elements 13 which are angled on top in the shape of a roof. The beam-like distributor elements 13 extend horizontally and parallel to each other and have a spacing 29 between them through which green malt can emerge. The ends of the beam-like distributor elements 13 run on guide rails 14.

Figure 2:
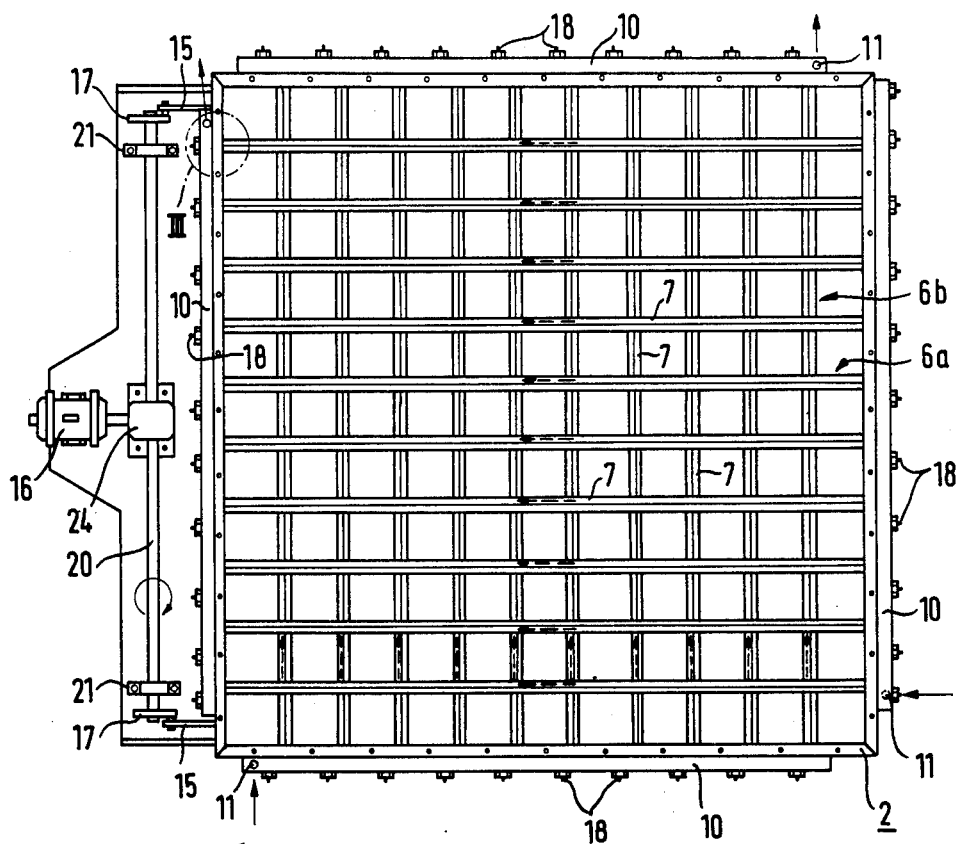
FIG. 2 is a section II—II through the installation of FIG. 1.

As can be seen particularly in FIG. 2, the beam-like distributor elements 13 are secured jointly at their ends to two rods 15. Each rod 15 is eccentrically journaled to an eccentric disc 17. The two eccentric discs 17 sit on a common shaft 20 which rests in bearing 21. The shaft 20 is connected with a motor 16 via a gear 24. When the motor 16 rotates the shaft 20, the distributor elements 13 are periodically reciprocated by this mechanism.

At the upper end of the container 1, a feeder device 26 for barley or green malt 27 is provided. The feeder device 26 is covered over by a roof-like construction 25.

The container is further provided with a device for introducing fresh air and/or evacuating carbon dioxide. This device is represented only schematically in the shape of a perforated tube 22 which extends into the interior of the container 1 and is provided with an exterior pump 28.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An installation for continuously producing green malt from barley, comprising a container having a top with means for receiving barley, a plurality of superposed, substantially horizontal grids of stationary parallel hollow tubes extending between the walls of the container at different levels throughout the container, the tubes of adjacent grids being angularly offset in relation to each other, the tubes being connected in a closed circuit to a supply system for cooling medium, whereby the germinating barley may be cooled solely through contact with the tubes, and a bottom on the container including means for dispensing green malt.

2. An installation in accordance with claim 1, wherein the tubes of each grid have a spacing such that the germinating barley grains form bridges between adjacent tubes in the manner of an arch, whereby the tubes control the rate of descent of the barley grains and limit the pressure acting on the barley in the lower portions of the container.

3. An installation in accordance with claim 1, wherein the tubes of the grids have a substantially quadrangular cross-section and are disposed so that their four edges point upwardly, downwardly, and to both sides.

4. An installation in accordance with claim 1, wherein the grid tubes are welded into the wall of the container, and conduit members are secured to the outside of the container in communication with the interiors of the tubes being connected together and to the supply system for the cooling medium through said conduit members.

5. An installation in accordance with claim 1, wherein the tubes have an outer diameter of about 40 mm and a spacing of about 180 mm, and the spacing between grids is about 370 mm.

6. An installation for continuously producing green malt from barley, comprising a container having a top with means for receiving barley, a plurality of superposed, substantially horizontal grids of stationary parallel tubes extending between the walls of the container at different levels, the tubes of adjacent grids being angularly offset in relation to each other, the tubes of each grid having a spacing such that the germinating barley grains form bridges between adjacent tubes in the manner of an arch, thereby lessening the load on the grain below, so that the tubes control the rate of descent of the barley grains and limit the pressure on the barley in the lower portions of the container, as well as loosen and turn over the grains during their descent, said tubes being connected to a supply system for cooling medium, and a bottom on the container including means for dispensing green malt.

7. An installation in accordance with claim 6 wherein the dispensing means comprises a horizontally movable grid of substantially parallel and horizontal beam-like distributor elements each of which tapers upwardly in the form of a roof and which have a relatively narrow spacing from each other for passage of the green malt, the ends of the distributor elements being positioned on guide rails extending transversely thereto, and the distributor elements being connected to an eccentric drive means for reciprocating them periodically.

* * * * *